United States Patent [19]

Bobsein et al.

[11] Patent Number: 5,245,000
[45] Date of Patent: Sep. 14, 1993

[54] POLY(ARYLENE SULFIDE) POLYMER CONTAINING SULFONE, ETHER AND BIPHENYL GROUPS

[75] Inventors: Rex L. Bobsein; Jon F. Geibel; Howard F. Efner, all of Bartlesville, Okla.

[73] Assignee: Phillips Petroleum Company, Bartlesville, Okla.

[21] Appl. No.: 724,270

[22] Filed: Jul. 1, 1991

[51] Int. Cl.$^5$ .............................. C08G 75/00
[52] U.S. Cl. ...................... 528/171; 128/126; 128/128; 128/174; 128/388
[58] Field of Search ............. 528/126, 128, 171, 174, 528/388

[56] References Cited

U.S. PATENT DOCUMENTS

| | | | |
|---|---|---|---|
| 4,016,145 | 4/1977 | Campbell | 528/390 |
| 4,108,837 | 8/1978 | Johnson et al. | 528/126 |
| 4,783,520 | 11/1988 | Kelsey et al. | 528/174 |
| 4,808,694 | 2/1989 | Edmonds, Jr. et al. | 528/125 |

OTHER PUBLICATIONS

"Polyelhersulfones", Encyclopedia of Chemical Technology, 3rd Edition, vol. 18, pp. 605-610, & 613-615 (1982).

"Polysulfone Resins", Encyclopedia of Chemical Technology, 3rd Edition, vol. 18, pp. 832-847 (1982).

"Poly(aryl Ethers) by Nucleophilic Chromatic Substitution, I. Synthesis and Properties", Johnson et al., Journal of Polymer Science: Part A-1, vol. 5, pp. 2375-2398 (1967).

*Primary Examiner*—John Kight, III
*Assistant Examiner*—Duc Truong
*Attorney, Agent, or Firm*—Beverly M. Dollar

[57] ABSTRACT

Poly(arylene sulfide) polymers containing sulfone, ether and biphenyl groups are prepared by a two step process. In the first step, a diphenol is reacted with either a dihaloaromatic sulfone monomer or a bis(-haloarylsulfonyl) biphenyl monomer, or both, in the presence of an alkali metal base and a polar organic compound. In the second step, the reaction mixture above is reacted with a sulfur source, and any monomer which was not employed in the first step, if any. The polymers prepared according to the invention process exhibit increased glass transition temperatures over those of known poly(arylene sulfide) polymers. The structure of repeating units of the polymer can be controlled by varying the sequence of addition of the monomers.

77 Claims, No Drawings

5,245,000

POLY(ARYLENE SULFIDE) POLYMER CONTAINING SULFONE, ETHER AND BIPHENYL GROUPS

FIELD OF THE INVENTION

This invention relates to poly(arylene sulfide), (PAS) polymers. In another of its aspects this invention relates to a process for the production of poly(arylene sulfide) polymers containing sulfone, ether and biphenyl groups. In accordance with a further aspect this invention relates to a two-step process for the production of poly(phenylene sulfide) polymers containing sulfone, ether and biphenyl groups which exhibit increased glass transition temperatures.

BACKGROUND OF THE INVENTION

A wide variety of high polymers have been prepared from aromatic compounds, many of which are currently produced and marketed on a moderate to large scale. While such polymers are useful in many areas, one property of high polymers, particularly those of the thermoplastic type, which needs to be improved is the ability to withstand high use temperatures. Thermoplastic high polymers frequently form a continuous matrix for reinforcing agents and fillers which are added to alter the properties of the polymers before they are shaped into useful articles such as electrical and automotive parts. High polymers that will withstand high use temperatures alone or in combination with other ingredients are desirable. Poly(arylene sulfide sulfones), (PASS) polymers containing ether groups are disclosed in U.S. Pat. No. 4,808,694 (Edmonds, Jr. et al). The process disclosed employs aromatic diphenols for the preparation of poly(arylene sulfide sulfone) polymers. The PASS-ether polymers produced by this method exhibit increased glass transition temperatures, (Tg) over polymers having only sulfone components.

A method for the preparation of polymers having even higher Tgs would be desirable in order to make articles for high temperature use.

Accordingly, an object of this invention is to provide a process for producing PAS polymers which exhibit good high temperature properties. It is a further objective of this invention to provide a process employing bis(haloarylsulfonyl) biphenyls for the preparation of PAS polymers suitable for melt shaping useful articles.

SUMMARY OF THE INVENTION

In one embodiment of this invention, a PAS polymer containing sulfone, ether, and biphenyl groups is prepared by reacting a diphenol, a dihaloaromatic sulfone and a bis(haloarylsulfonyl) biphenyl, in the presence of an alkali metal base and a polar organic compound. The reaction system is subsequently reacted with a sulfur source to give a poly(arylene sulfide) polymer containing sulfone, ether, and biphenyl groups.

In another embodiment of this invention, a PAS polymer containing sulfone, ether, and biphenyl groups is prepared by reacting a diphenol a dihaloaromatic sulfone in the presence of an alkali metal base and a polar organic compound. The reaction system is subsequently reacted with a bis(haloarylsulfonyl) biphenyl and a sulfur source to give the polymer containing sulfone, ether, and biphenyl groups.

In yet a third embodiment of this invention, a PAS polymer containing sulfone, ether, and biphenyl groups is prepared by reacting a diphenol with a bis(haloarylsulfonyl) biphenyl in the presence of an alkali metal base and a polar organic compound. The reaction system is subsequently reacted with a dihaloaromatic sulfone and a sulfur source to give the polymer containing sulfone, ether, and biphenyl groups.

DETAILED DESCRIPTION

In accordance with this invention, a PAS polymer containing sulfone, ether and biphenyl groups can be prepared in a two step process.

In one embodiment, in the first step, a diphenol is reacted with a dihaloaromatic sulfone and a bis(haloarylsulfonyl) biphenyl, in the presence of an alkali metal base, and optionally, in the presence of an alkali metal carboxylate under polymerization conditions. Subsequently, in a second step a sulfur source, an alkali metal carboxylate and water are added to the reaction mixture to continue a polymerization reaction resulting in a polymeric composition with a higher glass transition temperature, Tg.

In second and third embodiments, in the first step, a diphenol is reacted with either a) a dihaloaromatic sulfone or b) a bis(haloarylsulfonyl) biphenyl in the presence of an alkali metal base and, optionally in the presence of an alkali metal carboxylate under polymerization conditions. Subsequently, in a second step a sulfur source, an alkali metal carboxylate, water, and either a) the bis(haloarylsulfonyl) biphenyl or b) the dihaloaromatic sulfone are added to the reaction mixture to continue a polymerization reaction resulting in a polymeric composition with a higher glass transition temperature, Tg.

As used herein, a polymer with a non-predictable sequence of repeating units is referred to as a random polymer. A polymer which contains ordered groups of repeating units is referred to as a block polymer. The polymers produced by this invention contain aromatic (arylene), sulfide, sulfone, ether, and biphenyl groups in the backbone of the polymer. Although blocks of repeating units can be present, they can also occur in a random sequence, consistent with the constraints imposed by the structures of the monomers.

The inventive polymers are produced by a two-step sequence of reactions. Step number 1 comprises the reaction of the diphenol with a known excess of dihaloaromatic monomer. Step number 2 comprises the addition of a sulfur source and optionally more dihaloaromatic monomer. Since there are at least two dihaloaromatic monomers, the repeating units produced in steps 1 and 2 will be determined by which dihaloaromatic monomers are present in each of the two steps. The resultant polymer contains the various possible repeating units in a statistically random order, but is constrained within the stoichiometry requirements imposed by the monomer ratios. For example, in the first embodiment of this invention where the diphenol, bis(haloarylsulfonyl) biphenyl and dihaloaromatic sulfone monomers are reacted in the first step, the resulting polymer contains the following repeating units in any order:

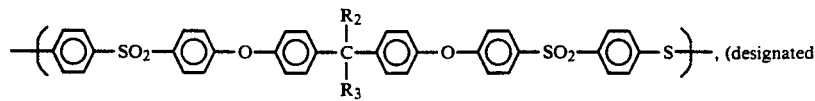, (designated herein in Examples as BCPS/BPA/BCPS);

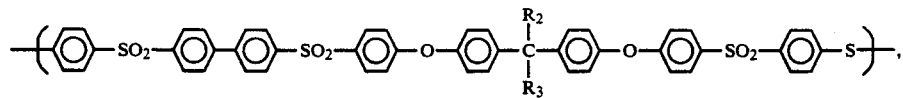, (designated herein in Examples as BCPSB/BPA/BCPS);

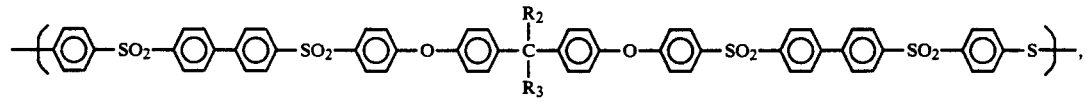, (designated herein in Examples as BCPSB/BPA/BCPSB);

, (designated herein in the Examples as BCPS/S);

and

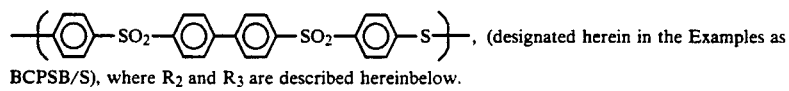, (designated herein in the Examples as

BCPSB/S), where $R_2$ and $R_3$ are described hereinbelow.

It is noted that for step number 1, where the diphenol is reacted with an excess of at least one dihaloaromatic monomer, only the initially formed oligomer of this reaction has been depicted above. Clearly, since the molar quantities of dihaloaromatic monomer are in large excess of the molar quantity of diphenol, the predominant ether-containing product will contain only one residue per unit derived from the diphenol. There may, however, be oligomers containing two or more residues derived from the diphenol.

When the second embodiment is practiced, the bis(-haloarylsulfonyl) biphenyl is added in the second step. Thus, the resulting polymer will primarily contain the first, fourth, and fifth repeating units shown above. The order of these repeating units in the final polymer is random.

When the third embodiment is practiced, the dihaloaromatic sulfone is added in the second step. Thus, the resulting polymer will primarily contain the third, fourth, and fifth repeating units shown above. The order of these repeating units in the final polymer is random.

Dihaloaromatic sulfones that can be employed in this invention are bis(halophenyl) sulfones, optionally having each phenyl ring substituted with one to four R groups, where each R is individually and independently selected from the group consisting of hydrogen and alkyl groups having 1 to about 4 carbon atoms, the total number of carbon atoms in each molecule being within the range of 12 to about 44.

Examples of some bis(halophenyl) sulfones that can be employed in the process of this invention include bis(p-chlorophenyl) sulfone, bis(p-fluorophenyl) sulfone, bis(p-bromophenyl) sulfone, bis(p-iodophenyl) sulfone, bis(2-methyl-4-chlorophenyl) sulfone, bis(2,5-dimethyl-4-chlorophenyl) sulfone, p-chlorophenyl p-bromophenyl sulfone, bis(3-isopropyl-4-iodophenyl) sulfone, bis(2,5-dipropyl-4-chlorophenyl) sulfone, bis(2-butyl-4-fluorophenyl) sulfone, bis(2,3,5,6-tetramethyl-4-chlorophenyl) sulfone, and the like, and mixtures thereof. The presently preferred dihaloaromatic sulfone is bis(p-chlorophenyl) sulfone).

One type of aromatic diphenol that can be employed in the process of the invention is bis(alkylhydroxyphenyl) derivatives having the generalized structure

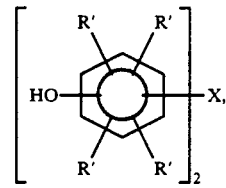

where X is —S—, —SO—, —SO$_2$—, —O—, a bond or an alkylene radical, each R' is individually and independently selected from the group consisting of hydrogen and alkyl groups having 1 to about 4 carbon atoms. Examples of such aromatic diphenols, where X is —S— or —SO$_2$— include bis(4-hydroxyphenyl) sulfide (Bisphenol T), and bis(4-hydroxyphenyl) sulfone (Bisphenol S).

When X is an alkylene radical, the aromatic diphenols are bis(alkylhydroxyphenyl) alkanes which are characterized by having an alkylene radical link between two phenolic groups, such as

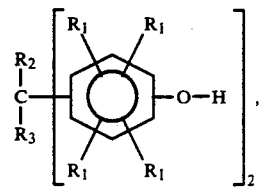

where each $R_1$ is individually and independently selected from the group consisting of hydrogen and alkyl and halogen-substituted groups having 1 to about 4 carbon atoms, and each $R_2$ and $R_3$ are individually and independently selected from the group consisting of hydrogen, halogen atoms and alkyl groups having 1 to about 11 carbon atoms such that the sum of the carbon atoms represented by $R_2$ plus $R_3$ is less than 12 carbon atoms, the sum of carbon atoms in $R_1$, $R_2$, and $R_3$ groups does not exceed 43, and the total number of carbon atoms in each molecule is within the range of 13 to about 55.

Examples of some aromatic diphenols having the structure set out above that can be employed in the process of this invention include among others: bis(4-hydroxyphenyl) methane, bis(2-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(3-methyl-4-hydroxyphenyl) propane, 2,2-bis(2-isopropyl-4-hydroxyphenyl) propane, 2,2-bis(3-butyl-4-hydroxyphenyl) propane, 2,2-bis(4-hydroxyphenyl)1,1,1,3,3,3-hexafluoropropane, commonly known as Hexafluorobisphenol A, and the like, and mixtures thereof. Presently preferred is 2,2-bis(4-hydroxyphenyl) propane, commonly known as Bisphenol A.

Examples of other types of aromatic diphenols include hydroquinones, biphenols, dihydroxynaphthalenes, bis(hydroxyphenyl) ketones, dihydroxyphenylketones, phenolphthalein, dihydroxyfluorenones and alkyl and aryl ring-substituted derivatives thereof.

The dihaloaromatic sulfonyl biphenyls that can be employed in the process of this invention are bis(halophenylsulfonyl) biphenyls such as bis(4-chlorophenylsulfonyl) biphenyl, bis(4-bromophenylsulfonyl) biphenyl, bis(4-iodophenylsulfonyl) biphenyl and bis(2-methyl-4-chorophenylsulfonyl) biphenyl, and the like. Presently preferred is bis(4-chlorophenylsulfonyl) biphenyl.

Sulfur sources that can be employed in the process of this invention include hydrogen sulfide, alkali metal hydrosulfides such as sodium hydrosulfide, lithium hydrosulfide, potassium hydrosulfide, alkali metal sulfides such as sodium sulfide, lithium sulfide, or potassium sulfide, and mixtures thereof. For convenience, the sulfur source can be added as an aqueous solution. Additional sulfur sources include, among others, those cited in U.S. Pat. No. 3,919,177 such as the acyclic and cyclic thioamides exemplified by N-methyl-2-pyrrolidinethione.

Alkali metal bases that can be employed in the process of this invention include lithium hydroxide, sodium hydroxide, potassium hydroxide, rubidium hydroxide, cesium hydroxide, lithium carbonate, sodium carbonate, potassium carbonate and mixtures thereof. The preferred base is sodium carbonate, which is added in the first step in an amount required for both steps.

Alkali metal carboxylates that can be employed in the process of this invention can be represented by the formula $R''(COOM)_n$, where $R''$ is a monovalent or divalent hydrocarbyl radical having 1 to about 20 carbon atoms selected from alkyl, cycloalkyl, aryl, alkaryl and aralkyl, and M is an alkali metal selected from the group consisting of lithium, sodium, potassium, rubidium and cesium, and n is 1 or 2. Preferably, $R''$ is an alkyl radical having 1 to about 6 carbon atoms or a phenyl radical, and M is sodium. If desired, the alkali metal carboxylate can be employed as a hydrate or as a solution or dispersion in a liquid.

Examples of some alkali metal carboxylates that can be employed in the process of this invention include lithium acetate, sodium acetate, potassium acetate, lithium propionate, sodium propionate, rubidium butyrate, lithium valerate, sodium valerate, cesium hexanoate, lithium cyclohexane carboxylate, potassium benzoate, sodium benzoate, lithium benzoate, sodium adipate, lithium adipate, sodium phthalate, sodium terephthalate, lithium terephthalate and the like, and mixtures thereof. Sodium acetate is preferred.

The polar organic compounds that can be used in the method of this invention should be substantially liquid at the reaction temperatures and pressures employed. It is preferred to use organic amides as the polar organic compound. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, dimethylbenzamide and the like, and mixtures thereof. N-Methyl-2-pyrrolidone (NMP) is preferred.

Other suitable polar organic compounds include 1,3-dimethyl-2-imidazolidinone, dimethylsulfoxide, sulfolane, tetramethylureas, and hexamethylphosphoramide. The polar organic compound used can also be mixtures of those listed above with an organic amide such as exemplified in the proceeding paragraph.

A wide variety of reaction conditions can be employed in the practice of the invention. Similarly, any proportions of reactants which will react with each other to produce the polymers of this invention are within the scope of the invention.

When the dihaloaromatic sulfone is employed in the first step of the inventive process, an excess of the dihaloaromatic sulfone is generally employed, the excess conveniently being expressed as the ratio of: moles dihaloaromatic sulfone/moles diphenol. This molar ratio generally can vary from about 100/1 to about 2/1, preferably from about 20/1 to about 4/1.

Whether added in the first or second step, the amount of bis(haloarylsulfonyl) biphenyl employed is chosen such that the molar ratio of bis(haloarylsulfonyl) biphenyl to dihaloaromatic sulfone is in the range of 99/1 to 0.01/1, more preferably 4/1 to 0.02/1.

The amount of sulfur source added in the second step is chosen such that the ratio: (moles of dihaloaromatic sulfone plus moles of bis(haloarylsulfonyl biphenyl) minus the moles of diphenol)/moles sulfur source, is within the range of about 0.9/1 to about 1.4/1, preferably about 0.98/1 to about 1.06/1. The molar ratio of alkali metal base to sulfur source added in the second step is within the range of about 1/1 to about 2.5/1, preferably about 1.1/1 to about 2.2/1. When the alkali metal carboxylate is added totally in the second step, the ratio of the moles of alkali metal carboxylate to the sum of the moles of dihaloaromatic sulfone plus moles of bis(haloarylsulfonyl) biphenyl charged can vary over a wide range, but generally will be within the range of about 0.5/1 to 3/1, preferably about 0.9/1 to 1.1/1.

A polar organic compound is generally used as a transfer medium during the addition of sulfur source and alkali metal carboxylate. Water is also added during the second step to bring the total water, including water produced by reaction and water of hydration, present in the polymerization system to an amount such that the molar ratio of polar organic compound to water is less than about 2.5/1. Water of hydration can be contained in the sulfur source and the alkali metal base and must be taken into account.

When N-methyl-2-pyrrolidone is used, the NMP and water are added in amounts such that the molar ratio of NMP to sulfur source is in the range of 3/1 to 24/1, and the ratio: (moles total NMP)/(moles total water including water of reaction and hydration) is in the range from about 0.4/1 to about 2/1, and even more preferred in the range from about 0.6/1 to about 1.3/1.

It is to be understood that the process of our invention can be carried out by mixing the reactants in any order in a first process step. Then, in a second process step the sulfur source, the alkali metal carboxylate and, if required, the remaining reactants and any remaining quantity of the alkali metal base and polar organic compound are added. The alkali metal carboxylate and bis(haloarylsulfonyl) biphenyl or dihaloaromatic sulfone must be added in the second step, when they are not present in the first step.

Although the temperature at which reaction in a first process step is conducted can vary over a considerable range, generally it is within the range of about 100° to about 240° C., preferably about 150° to about 210° C. The reaction temperature in a second process step generally is within the range of about 170° to about 240° C., preferably about 180° to about 220° C.

It has been discovered that the molecular weight of the poly(arylene sulfide) polymers containing sulfone, ether, and biphenyl groups can be increased, if desired, by venting the reactor during the first step. The venting procedure is preferably performed by venting the reaction mixture during the heat-up when a temperature in the range of 100°-150° C., preferably about 120° C. is achieved. The venting procedure is performed until all or at least a portion of the water has been removed. If this procedure is performed, the reaction temperature in a second process step generally is within the range of about 175° to about 235° C., preferably about 190° to about 215° C., and most preferably about 195° to about 205° C.

The reaction time of the first step can vary widely, depending in part on the reaction temperature, but generally will be within the range of about 0.01 to about 7 hours, preferably about 1 minute to about 4 hours. It has been discovered that polymers of higher molecular weight can be prepared by limiting the reaction time of the first step to a period in the range of 1 minute to 2 hours, more preferably 5 minutes to 1 hour. The pressure should be sufficient to maintain the monomers and the polar organic compound substantially in the liquid phase, generally within the range of about 0 to about 1500 psig, preferably about 50 to about 400 psig.

The reaction time of the second process step can vary widely, depending in part on the reaction temperature, but generally will be within the range of about 0.5 to about 24 hours, preferably about 1 to about 5 hours.

After the second step of the reaction has proceeded for the desired time, the reaction mixture is cooled. The mixture can be cooled slowly by discontinuation of the heating, or alternately, more rapidly by introduction of a coolant through internal or external coils. In a preferred embodiment a quench fluid is added to the reaction mixture after the heating is discontinued. For example, a quench fluid such as water, NMP or mixtures thereof can be added during a time period which is shorter than the second step reaction time. For example, liquid NMP in an amount equivalent to about ⅛ to ¼ of the total NMP used in the two-step reaction process can be added to the reaction mixture over a five minute period after the heat is discontinued. The reaction mixture is allowed to cool further before the polymeric solids are recovered. Use of a quench fluid improves the recovery of polymeric solids in that particles easily recovered by filtration are formed.

The poly(arylene sulfide) polymers produced by the inventive process can be separated from the reaction mixture by conventional procedures such as by filtration, followed by washing the recovered solids with water, or by dilution of the reaction mixture with NMP and/or water followed by filtration and water washing of the recovered solids.

Optionally, the invention polymer can be treated with a soluble zinc source at an elevated temperature to improve melt stability. For example, treatment of the dried polymeric solids with an aqueous containing from about 0.1 to about 10 grams zinc acetate per liter for about 0.5 to about 2 hours at a temperature in the range of about 20 to about 200° C. can yield treated-polymeric solids having an improved melt stability.

Unless otherwise noted herein, melt flow rates are measured using a 5 minute hold time and reported in units of grams/10 minutes in accordance with ASTM D 1238, condition 317/5.0.

The poly(arylene sulfide) polymers produced by the inventive process can be blended with fillers, pigments, extenders, other polymers, and the like. They can be the continuous matrix in fiber reinforced compositions such as prepregs, laminates and pultruded shapes. They can be cured through crosslinking and/or chain extension to provide cured products having thermal stability and good chemical resistance. They are useful in the production of coatings, film, molded objects and fibers. The polymers exhibit improved properties, especially the glass transition temperature.

The following examples are provided for the purpose of illustrating the invention. They are not meant to limit the spirit and scope of the invention.

EXAMPLES

In the following examples, the polymer glass transition temperature, $T_g$, in degrees Celsius, was measured using a Perkin-Elmer Differential Scanning Calorimeter, Model DSC-2C. The polymer inherent viscosity was measured at 30° C. using N-methyl-2-pyrrolidone at a solids concentration of 0.5 grams per 100 mL. The units of inherent viscosity (I.V.) are deciliters per gram, dL/g. Polymer melt temperatures, PMT, are expressed in degrees Celsius and were determined by observing where the polymeric solids melt on a temperature gradient bar.

EXAMPLE I

This example is a control example illustrating a polymer made without the biphenyl-containing monomer of the present invention. In a one-liter stainless steel autoclave, a mixture of 0.375 g-mol bis(4-chlorophenyl) sulfone (BCPS), 0.75 g-mol sodium carbonate ($Na_2CO_3$), 0.0375 g-mol bisphenol A (BPA), and 1.5 g-mol NMP was purged with nitrogen, stirred at 600 rpm, and heated to 200° C. After three hours, the mixture was cooled to about 50° C. Using vacuum transfer the following materials were added to the reaction mixture: 0.341 g-mol sodium hydrosulfide (NaSH) containing 0.7 g-mol water 0.375 g-mol sodium acetate (NaOAc), 2.83 g-mol water, and 1.5 g-mol NMP. The contents of the autoclave were heated to 200° C. After three hours, 100 mL NMP were added over a five minute period to the polymerization mixture. After the mixture was cooled, the recovered solids were washed with hot distilled water and filtered. This washing procedure was repeated five times. The recovered solid was dried at about 150° C. under vacuum to yield Polymer 1, which had an I.V. of 0.45 dL/g and a Tg of 217° C. The PMT of Polymer 1 was 305° C.

EXAMPLE II

This example contains an illustration of the second embodiment of this invention utilizing bis(4-chlorophenylsulfonyl) biphenyl (BCPSB) as a reactant in the second step. In a one-liter stainless steel autoclave a mixture of 0.356 g-mol BCPS, 0.75 g-mol $Na_2CO_3$, 0.0188 g-mol BPA, and 2 g-mol NMP was purged with nitrogen, stirred, and heated to 200° C. After 30 minutes, the mixture was cooled to about 60° C. A 0.360 g-mol sample of NaSH (added as a 59.4 weight percent aqueous mixture), 0.375 g-mol NaOAc, 2.58 g-mol water, 0.0188 g-mol BCPSB, and 1 g-mol NMP were charged to the autoclave. The molar ratio of total expected water to NASH was 9.81:1, the NMP:NaSH mole ratio was 8.34:1 and the NMP:water ratio was 0.85/1. The contents of the autoclave were heated to 200° C. with stirring and held for three hours. Approximately 100 mL of NMP was added to the autoclave and the resulting solid was recovered. The solid was washed with hot acetone, washed with hot water, and filtered.

The recovered solid was dried at 150° C. in a vacuum to produce Polymer 2 in a 93% yield. Polymer 2 had an I.V. of 0.46 dL/g, PMT of 330° C., and Tg of 225° C. Compared with control Polymer 1, the invention Polymer 2 exhibited an increased PMT and Tg. The polymer repeating units in Polymer 2 were 89.4 mol % BCPS/S, 5.3 mol % BCPSB/S and 5.3 mol % BPA/BCPS.

EXAMPLE III

This example contains several polymerizations runs to demonstrate the process of this invention using different ratios of components and reaction conditions. Each polymerization was carried out using a procedure similar to that described in Example II. Changes in the reactant levels and first step times are listed in Table I. Run 6 was carried out in a 7.6 liter autoclave using 3 g-mol $Na_2CO_3$, a total of 12 g-mol NMP, 1.5 g-mol NaOAc, and 10.43 g-mol added water. The aqueous NaSH in Run 6 contained 59.7 weight percent NaSH. Polymers with I.V.s greater than 0.30 dL/g were obtained with times of three and 0.5 hours in the first step of the reaction. A time of 0.1 hour for the first step in Run 8 gave a lower I.V. and yield.

Changes in the mole ratios of the monomers caused changes in the theoretical mole ratios of the polymer repeating units. The calculated repeating unit mole ratios for the polymers of this example are summarized in Table II. Polymer 2 is included in Table II for comparison. This example shows that the polymers of this invention can be prepared in many different forms at high yields. As shown in Tables I and II would be expected, the polymer Tg, I.V., and PMT vary with changes in polymer repeating unit content. Values as high as 0.52 dL/g for I.V., 252° C. for Tg, and 360° C. for PMT were observed.

TABLE I

Polymers with Varying Compositions

| Run | NaSH, g-mol | BCPS, g-mol | BCPSB, g-mol | BPA, g-mol | 1st Step hrs | I.V., dL/g | Tg, °C. | Yield wt. % | PMT, °C. |
|---|---|---|---|---|---|---|---|---|---|
| 3 | 0.341 | 0.1875 | 0.1875 | 0.0375 | 3.0 | 0.52 | 252 | 97 | 360 |
| 4 | 0.227 | 0.2000 | 0.0500 | 0.0250 | 3.0 | 0.32 | 224 | 92 | 280 |
| 5 | 0.341 | 0.3375 | 0.0375 | 0.0375 | 0.5 | 0.49 | 233 | 96 | 320 |
| 6 | 1.394 | 1.4250 | 0.0750 | 0.0750 | 0.5 | 0.38 | 222 | 92 | (a) |
| 7 | 0.341 | 0.3375 | 0.0375 | 0.0375 | 0.1 | 0.17 | (a) | 83 | 240 |

(a) Not determined

TABLE II

Calculated Polymer Repeating Unit Ratios

| Run | 2 | 3 | 4 | 5 | 6 | 7 |
|---|---|---|---|---|---|---|
| BCPS/S, mol % | 89.4 | 33.3 | 66.7 | 77.8 | 89.5 | 77.8 |
| BCPSB/S, mol % | 5.3 | 5.55 | 22.2 | 11.1 | 5.26 | 11.1 |
| BCPS/BPA/BCPS, mol % | 5.3 | 11.1 | 11.1 | 11.1 | 5.26 | 11.1 |

EXAMPLE IV

The three embodiments of this invention achieved by utilizing different orders of monomer addition are described in this example to illustrate the range of polymers that can be prepared by the process of this invention. The polymerizations were carried out in a manner similar to that described in Example II except for the order of monomer addition. Table III shows the monomer levels and monomer charge sequence. All three runs had good yields and Tg values as high as 254° C. in run 8 were observed. I.V. values as high as 0.51 dL/g and PMT as high as 335° C. were obtained in these runs. The polymer repeating unit ratios of these polymers are set out in Table IV. In Polymer 8, prepared according to the first embodiment of this invention, the ether units are randomly distributed with the sulfone groups from the bis(haloarylsulfonyl) biphenyl and dihaloaromatic sulfone monomers. In Polymers 9 and 10, the ether units are present in repeating units with the sulfone from the monomer added in the first step. These runs demonstrate that different orders of monomer addition can be used to produce polymers with different repeating unit orders and different properties.

Carbon 13 nuclear magnetic resonance (NMR) spectroscopy of Polymer 8 in acetone at 50° C. showed that Bisphenol A was present in the polymer at a level of about 11 percent. A similar carbon 13 NMR spectrum of Polymer 10 showed that Bisphenol A was present at a level of about 5.4 percent.

TABLE III

Polymers Made with Different Addition Sequences

| Run | NaSH, g-mol | BCPS, g-mol | BCPSB, g-mol | BPA, g-mol | Monomers Charged 1st Step | Monomers Charged 2nd Step | IV, dL/g | Tg, °C. | Yield wt. % | PMT, °C. |
|---|---|---|---|---|---|---|---|---|---|---|
| 8 | 0.341 | 0.1875 | 0.1875 | 0.0375 | BCPS | — | 0.45 | 254 | 98 | 335 |

TABLE III-continued

Polymers Made with Different Addition Sequences

| Run | NaSH, g-mol | BCPS, g-mol | BCPSB, g-mol | BPA, g-mol | Monomers Charged 1st Step | Monomers Charged 2nd Step | IV, dL/g | Tg, °C. | Yield wt. % | PMT, °C. |
|---|---|---|---|---|---|---|---|---|---|---|
| 9 | 0.227 | 0.1250 | 0.1250 | 0.0250 | BCPSB BPA BCPSB BPA | BCPS | 0.23 | 238 | 89 | 285 |
| 10 | 0.360 | 0.3562 | 0.0187 | 0.0187 | BCPS BPA | BCPSB | 0.51 | 225 | 95 | 335 |

TABLE IV

| | Calculated Polymer Repeating Unit Ratios | | |
|---|---|---|---|
| Run | 8[a] | 9 | 10 |
| BCPS/S, mol % | — | 55.6 | 89.5 |
| BCPSB/S, mol % | — | 33.3 | 5.25 |
| BCPS/BPA/BCPS, mol % | — | 0 | 5.25 |
| BCPSB/BPA/BCPSB, mol % | — | 11.1 | 0 |
| BCPS/BBA/BCPSB, mol % | — | 0 | 0 |

[a] Both BCPS and BCPSB are present in step 1, so the following repeating units are theoretically possible: BCPS/BPA/BCPS, BCPS/BPA/BCPSB and BCPSA/BPA/BCPSB, where the sum of the mole % for these repeating units would be 11.1%. The sum of the mole % for the repeating units synthesized in step 2 (BCPS/S and BCPSB/S would be 88.9%.

EXAMPLE V

Several runs were made with hydroquinone as the diphenol in place of Bisphenol A. The polymerizations were carried out in a manner similar to that described in Example II. Table V shows the monomer amounts and polymer analyses. In Runs 11 and 12, BCPS, BCPSB, and hydroquinone (HQ) were added in the first step. In Run 13, BCPS and HQ were added in the first step and BCPSB was added in the second step. As shown in Table V, the polymers were obtained in good yield with I.V. values as high as 0.33 dL/g in Run 13. The calculated polymer repeating unit mole ratios are shown in Table VI.

TABLE V

Polymers Made with Hydroquinone

| Run | NaSH, g-mol | BCPS, g-mol | BCPSB, g-mol | HQ,[a] g-mol | I.V., dL/g | Yield, wt. % | PMT, °C. |
|---|---|---|---|---|---|---|---|
| 11 | 0.360 | 0.3562 | 0.0187 | 0.0188 | 0.31 | 93 | 315 |
| 12 | 0.360 | 0.3562 | 0.0187 | 0.0188 | 0.33 | 91 | 300 |
| 13 | 0.341 | 0.3375 | 0.0375 | 0.0375 | 0.29 | 90 | 300 |

[a] HQ = Hydroquinone

TABLE VI

| | Calculated Polymer Repeating Unit Ratios | | |
|---|---|---|---|
| Run | 11[a] | 12[a] | 13 |
| BCPS/S, mol % | — | — | 77.8 |
| BCPSB/S, mol % | — | — | 11.1 |
| BCPS/HQ/BCPS, mol % | — | — | 11.1 |
| BCPSB/HQ/BCPSB, mol % | — | — | 0 |
| BCPS/HQ/BCPSB, mol % | — | — | 0 |

[a] Both BCPS and BCPSB are present in step 1, so the following repeating units are theoretically possible: BCPS/HQ/BCPS, BCPS/HQ/BCPSB and BCPSB/HQ/BCPSB, where the sum of the mole % for these repeating units would be 5.28%. The sum of the mole % for the repeating units synthesized in step 2 (BCPS/S and BCPSB/S) would be 94.72%.

While this invention has been described in detail for the purposes of illustration, it is not meant to be limited thereby, but is intended to cover all reasonable modifications thereof.

That which is claimed is:

1. A process for preparing a polymeric composition which comprises:

a) contacting a diphenol, a dihaloaromatic sulfone, a bis(haloarylsulfonyl) biphenyl, an alkali metal base, and a polar organic compound under polymerization conditions to form a first reaction mixture; and thereafter b) contacting said first reaction mixture with a sulfur source, an alkali metal carboxylate, water, and an additional amount of said polar organic compound under polymerization conditions; and c) recovering the thus formed polymeric composition.

2. A process according to claim 1 wherein said polymerization step a) is conducted at a temperature in the range of 100° to 240° C., for a time period in the range of 0.01 to 7 hours, at a pressure in the range of 0 to 1500 psig; and polymerization step b) is conducted at a temperature in the range of 170° to 240° C., for a time period in the range of 0.5 to 24 hours, at a pressure in the range of 0 to 1500 psig.

3. A process according to claim 1 wherein the molar ratio of the water present at the end of step b) to the total amount of polar organic compound added in steps a) and b) is in the range of 2/1 to 0.4/1.

4. A process according to claim 1 wherein the molar ratio of polar organic compound to sulfur source is in the range of 3/1 to 24/1.

5. A process according to claim 1 wherein the molar ratio of dihaloaromatic sulfone to diphenol is in the range of 100/1 to 2/1.

6. A process according to claim 1 wherein the molar ratio of bis(haloarylsulfonyl) biphenyl to dihaloaromatic sulfone is in the range of 99/1 to 0.01/1.

7. A process according to claim 1 wherein the ratio of the sum of dihaloaromatic sulfone plus bis(haloarylsulfonyl) biphenyl minus the moles of diphenol, to the moles of sulfur source employed in step b) is in the range of 0.9/1 to 1.4/1.

8. A process according to claim 1 wherein the molar ratio of said alkali metal base to said sulfur source is in the range of 1/1 to 2.5/1.

9. A process according to claim 1 wherein the molar ratio of said alkali metal carboxylate to said dihaloaromatic sulfone is in the range of 0.5/1 to 3/1.

10. A process according to claim 1 wherein said diphenol is 2,2-bis(4-hydroxyphenyl)propane.

11. A process according to claim 1 wherein said diphenol is hydroquinone.

12. A process according to claim 1 wherein said dihaloaromatic sulfone is bis(4-chlorophenyl) sulfone.

13. A process according to claim 1 wherein said bis(haloarylsulfonyl) biphenyl is bis(4-chlorophenylsulfonyl) biphenyl.

14. A process according to claim 1 wherein said sulfur source is an alkali metal hydrosulfide.

15. A process according to claim 14 wherein said alkali metal sulfide is sodium hydrosulfide.

16. A process according to claim 1 wherein said polar organic compound is N-methyl-2-pyrrolidone.

17. A process according to claim 1 wherein said alkali metal base is sodium carbonate.

18. A process according to claim 1 wherein said alkali metal carboxylate is sodium acetate.

19. A process according to claim 2 wherein step a) is conducted for a time period in the range of 1 minute to 4 hours.

20. A process according to claim 2 wherein step b) is conducted for a time period in the range of 1 to 5 hours.

21. A process for preparing a polymeric composition which comprises:
  a) contacting reactants comprising 2,2-bis(4-hydroxyphenyl) propane, bis(4-chlorophenyl) sulfone, bis(4-chlorophenylsulfonyl) biphenyl, sodium carbonate, and N-methyl-2-pyrrolidone at a temperature in the range of 150° to 210° C. for a time period in the range of 1 minute to 4 hours, wherein the molar ratio of 2,2-bis(4-hydroxyphenyl) propane to bis(4-chlorophenyl) sulfone is in the range of 20/1 to 4/1, the molar ratio of bis(4-chlorophenylsulfonyl) biphenyl to bis(4-chlorophenyl) sulfone is in the range of 4/1 to 0.02/1; and thereafter
  b) adding sodium hydrosulfide, sodium acetate, water and additional N-methyl-2-pyrrolidone and maintaining said temperature in the range of 180° to 220° C. for an additional time period in the range of 1 to 5 hours, wherein the ratio of moles of bis(4-chlorophenyl) sulfone plus the moles of bis(4-chlorophenylsulfonyl) biphenyl minus the moles of 2,2-bis(4-hydroxyphenyl) propane to the moles of sodium hydrosulfide added in step b) is in the range of 0.98:1 to 1.06/1, the molar ratio of sodium carbonate to sodium hydrosulfide is in the range of 1/1 to 2.5/1, the molar ratio of sodium acetate to bis(4-chlorophenyl) sulfone is in the range of 0.9/1 to 1.1/1, the amount of N-methyl-2-pyrrolidone added in step b) is that sufficient to give a ratio of total moles of N-methyl-2-pyrrolidone to moles of sodium hydrosulfide in the range of 3/1 to 24/1, and the molar ratio of the total amount of N-methyl-2-pyrrolidone employed in steps a) and b) to water present at the end of step b) is in the range of 0.6/1 to 1.3/1; and
  c) recovering said polymeric composition.

22. A process according to claim 1 which further comprises treating said polymeric composition with a soluble zinc source at an elevated temperature.

23. A process according to claim 22 which further comprises treating said polymeric composition with zinc acetate at a temperature in the range of 20° to 200° C. for a time period in the range of 1 minute to 5 hours.

24. A process for preparing a polymeric composition which comprises:
  a) contacting a diphenol, a dihaloaromatic sulfone, an alkali metal base, and a polar organic compound under polymerization conditions to form a first reaction mixture; and thereafter
  b) contacting said first reaction mixture with a sulfur source, a bis(haloarylsulfonyl) biphenyl, an alkali metal carboxylate, water, and an additional amount of said polar organic compound under polymerization conditions; and
  c) recovering the thus formed polymeric composition.

25. A process according to claim 24 wherein said polymerization step a) is conducted at a temperature in the range of 100° to 240° C., for a time period in the range of 0.01 to 7 hours, at a pressure in the range of 0 to 1500 psig; and polymerization step b) is conducted at a temperature in the range of 170° to 240° C., for a time period in the range of 0.5 to 24 hours, at a pressure in the range of 0 to 1500 psig.

26. A process according to claim 24 wherein the molar ratio of the water present at the end of step b) the total amount of polar organic compound added in steps a) and b) is in the range of 2/1 to 0.4/1.

27. A process according to claim 24 wherein the molar ratio of polar organic compound to sulfur source is in the range of 3/1 to 24/1.

28. A process according to claim 24 wherein the molar ratio of dihaloaromatic sulfone to diphenol is in the range of 100/1 to 2/1.

29. A process according to claim 24 wherein the molar ratio of bis(haloarylsulfonyl) biphenyl to dihaloaromatic sulfone is in the range of 99/1 to 0.01/1.

30. A process according to claim 24 wherein the ratio of the sum of the moles of dihaloaromatic sulfone plus the moles of bis(haloarylsulfonyl) biphenyl minus the moles of diphenol, to moles of sulfur source employed in step b) is in the range of 0.9/1 to 1.4/1.

31. A process according to claim 24 wherein the molar ratio of said alkali metal base to said sulfur source is in the range of 1/1 to 2.5/1.

32. A process according to claim 24 wherein the molar ratio of said alkali metal carboxylate to said dihaloaromatic sulfone is in the range of 0.5/1 to 3/1.

33. A process according to claim 24 wherein said diphenol is 2,2-bis(4-hydroxyphenyl) propane.

34. A process according to claim 24 wherein said diphenol is hydroquinone.

35. A process according to claim 24 wherein said dihaloaromatic sulfone is bis(4-chlorophenyl) sulfone.

36. A process according to claim 24 wherein said bis(haloarylsulfonyl) biphenyl is bis(4-chlorophenylsulfonyl) biphenyl.

37. A process according to claim 24 wherein said sulfur source is an alkali metal hydrosulfide.

38. A process according to claim 37 wherein said alkali metal sulfide is sodium hydrosulfide.

39. A process according to claim 24 wherein said polar organic compound is N-methyl-2-pyrrolidone.

40. A process according to claim 24 wherein said alkali metal base is sodium carbonate.

41. A process according to claim 24 wherein said alkali metal carboxylate is sodium acetate.

42. A process according to claim 25 wherein step a) is conducted for a time period in the range of 1 minute to 4 hours.

43. A process according to claim 25 wherein step b) is conducted for a time period in the range of 1 to 5 hours.

44. A process for preparing a polymeric composition which comprises:
  a) contacting reactants comprising 2,2-bis(4-hydroxyphenyl) propane, bis(4-chlorophenyl) sulfone, sodium carbonate, and N-methyl-2-pyrrolidone at a temperature in the range of 150° to 210° C. for a time period in the range of 1 minute to 4 hours, wherein the molar ratio of 2,2-bis(4-hydroxyphenyl) propane to bis(4-chlorophenyl) sulfone is in the range of 20/1 to 4/1, and the molar ratio of sodium carbonate to bis(4-chlorophenyl) sulfone is in the range of 4/1 to 0.02/1; and thereafter
  b) adding sodium hydrosulfide, bis(4-chlorophenylsulfonyl) biphenyl, sodium acetate, water and additional N-methyl-2-pyrrolidone and maintaining said temperature in the range of 180° to 220° C. for an additional time period in the range of 1 to 5 hours, wherein the ratio of the sum of the moles of bis(4-chlorophenyl) sulfone plus moles of bis(4-chlorophenylsulfonyl) biphenyl minus the moles of 2,2-bis(4-hydroxyphenyl) propane to the moles of sodium hydrosulfide is in the range of 0.98/1 to 1.06/1, the molar ratio of bis(4-chlorophenylsulfonyl) biphenyl to bis(4-chlorophenyl) sulfone is in the range of 4/1 to 0.02/1, the molar ratio of sodium acetate to bis(4-chlorophenyl) sulfone is in the range of 0.9/1 to 1.1/1, the amount of N-methyl-2-pyrrolidone added in step b) is that sufficient to give a ratio of total moles of N-methyl-2-pyrrolidone to moles of sodium hydrosulfide in the range of 3/1 to 24/1, and the molar ratio of the total amount of N-methyl-2-pyrrolidone employed in steps a) and b) to water present at the end of step b) is in the range of 0.6/1 to 1.3/1; and c) recovering said polymeric composition.

45. A process according to claim 24 which further comprises treating said polymeric composition with a soluble zinc source at an elevated temperature.

46. A process according to claim 45 which further comprises treating said polymeric composition with zinc acetate at a temperature in the range of 20° to 200° C. for a time period in the range of 1 minute to 5 hours.

47. A process for preparing a polymeric composition which comprises:

a) contacting a diphenol, a bis(haloarylsulfonyl) biphenyl, an alkali metal base, and a polar organic compound under polymerization conditions to form a first reaction mixture; and thereafter b) contacting said first reaction mixture with a sulfur source, a dihaloaromatic sulfone, an alkali metal carboxylate, water, and an additional amount of said polar organic compound under polymerization conditions; and c) recovering the thus prepared polymeric compound.

48. A process according to claim 47 wherein said polymerization step a) is conducted at a temperature in the range of 100° to 240° C., for a time period in the range of 0.01 to 7 hours, at a pressure in the range of 0 to 1500 psig; and polymerization step b) is conducted at a temperature in the range of 170° to 240° C., for a time period in the range of 0.5 to 24 hours, at a pressure in the range of 0 to 1500 psig.

49. A process according to claim 47 wherein the molar ratio of the water present at the end of step b) the total amount of polar organic compound added in steps a) and b) is in the range of 2/1 to 0.4/1.

50. A process according to claim 47 wherein the molar ratio of polar organic compound to sulfur source is in the range of 3/1 to 24/1.

51. A process according to claim 47 wherein the molar ratio of dihaloaromatic sulfone to diphenol is in the range of 100/1 to 2/1.

52. A process according to claim 47 wherein the molar ratio of bis(haloarylsulfonyl) biphenyl to dihaloaromatic sulfone is in the range of 99/1 to 0.01/1.

53. A process according to claim 47 wherein the ratio of the sum of the moles of dihaloaromatic sulfone plus the moles of bis(haloarylsulfonyl) biphenyl minus the moles of diphenol, to the moles of sulfur source employed in step b) is in the range of 0.9/1 to 1.4/1.

54. A process according to claim 47 wherein the molar ratio of said alkali metal base to said sulfur source is in the range of 1/1 to 2.5/1.

55. A process according to claim 47 wherein the molar ratio of said alkali metal carboxylate to said dihaloaromatic sulfone is in the range of 0.5/1 to 3/1.

56. A process according to claim 47 wherein said diphenol is 2,2-bis(4-hydroxyphenyl) propane.

57. A process according to claim 47 wherein said diphenol is hydroquinone.

58. A process according to claim 47 wherein said dihaloaromatic sulfone is bis(4-chlorophenyl) sulfone.

59. A process according to claim 47 wherein said dihaloaromatic sulfonyl biphenyl is bis(4-chlorophenylsulfonyl) biphenyl.

60. A process according to claim 47 wherein said sulfur source is an alkali metal hydrosulfide.

61. A process according to claim 60 wherein said alkali metal sulfide is sodium hydrosulfide.

62. A process according to claim 47 wherein said polar organic compound is N-methyl-2-pyrrolidone.

63. A process according to claim 47 wherein said alkali metal base is sodium carbonate.

64. A process according to claim 47 wherein said alkali metal carboxylate is sodium acetate.

65. A process according to claim 48 wherein step a) is conducted for a time period in the range of 1 minute to 4 hours.

66. A process according to claim 48 wherein step b) is conducted for a time period in the range of 1 to 5 hours.

67. A process for preparing a polymeric composition which comprises:

a) contacting reactants comprising 2,2-bis(4-hydroxyphenyl) propane, bis(4-chlorophenylsulfonyl) biphenyl, sodium carbonate, and N-methyl-2-pyrrolidone at a temperature in the range of 150° to 210° C. for a time period in the range of 1 minute to 4 hours, b) adding sodium hydrosulfide, bis(4-chlorophenyl) sulfone, sodium acetate, water and additional N-methyl-2-pyrrolidone and maintaining said temperature in the range of 180° to 220° C. for an additional time period in the range of 1 to 5 hours, wherein the ratio of the sum of the moles of bis(4-chlorophenyl) sulfone plus moles of bis(4-chlorophenylsulfonyl) biphenyl minus moles of 2,2-bis(4-hydroxyphenyl) propane to the moles of sodium hydrosulfide is in the range of 0.98/1 to 1.06/1, the molar ratio of sodium acetate to bis(4-chlorophenyl) sulfone is in the range of 0.9/1 to 1.1/1, the amount of N-methyl-2-pyrrolidone added in step b) is that sufficient to give a ratio of total moles of N-methyl-2-pyrrolidone to moles of sodium hydrosulfide in the range of 3/1 to 24/1, the molar ratio of the total amount of N-methyl-2-pyrrolidone employed in steps a) and b) to water present at the end of step b) is in the range of 0.6/1 to 1.3/1, the molar ratio of bis(4-chlorophenyl) sulfone to 2,2-bis(4-hydroxyphenyl) propane is in the range of 20/1 to 4/1, the molar ratio of bis(4-chlorophenylsulfonyl) biphenyl to bis(4-chlorophenyl) sulfone is in the range of 4/1 to 0.02/1, and the molar ratio of sodium carbonate to sodium hydrosulfide is in the range of 1.1/1 to 2.2/1; and c) recovering said polymeric composition.

68. A process according to claim 47 which further comprises treating said polymeric composition with a soluble zinc source at an elevated temperature.

69. A process according to claim 68 which further comprises treating said polymeric composition with zinc acetate at a temperature in the range of 20° to 200° C. for a time period in the range of 1 minute to 5 hours.

70. A polymeric composition which consists essentially of repeating units containing phenyl groups linked to constituents selected from the group consisting of sulfur, oxygen, a biphenyl group, a sulfone group, and substituted and unsubstituted methyl groups.

71. A polymeric composition according to claim 70 which contains repeating units selected from the group consisting of

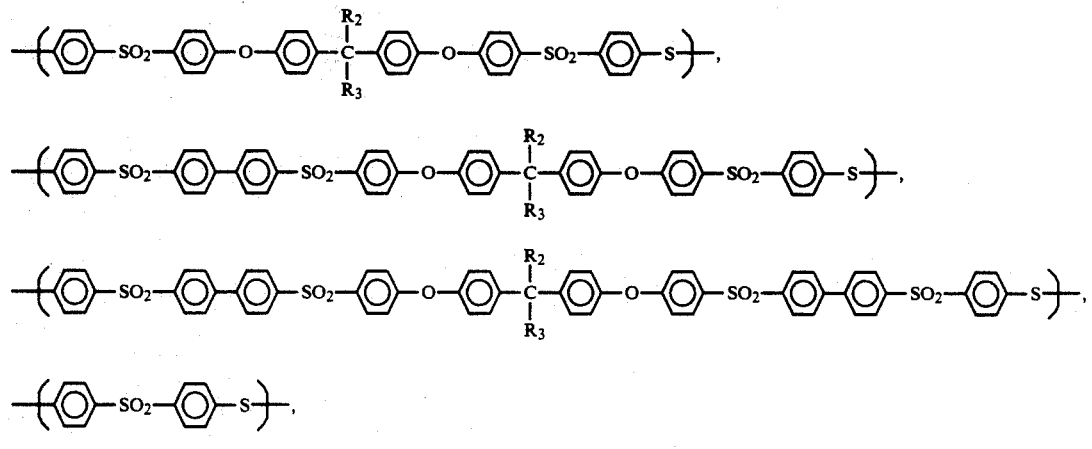

and

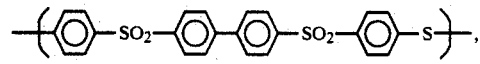

where $R_2$ and $R_3$ are independently selected from the group consisting of hydrogen, halogen atoms and alkyl groups having 1 to about 11 carbon atoms such that the sum of the carbon atoms represented by $R_2$ plus $R_3$ is less than 12 carbon atoms.

72. A polymeric composition prepared according to claim 1.

73. A polymeric composition prepared according to claim 21.

74. A polymeric composition prepared according to claim 24.

75. A polymeric composition prepared according to claim 44.

76. A polymeric composition prepared according to claim 47.

77. A polymeric composition prepared according to claim 67.